Dec. 8, 1953 M. COUSIN 2,661,727
INTERNAL-COMBUSTION ENGINE
Filed June 21, 1951 5 Sheets-Sheet 1
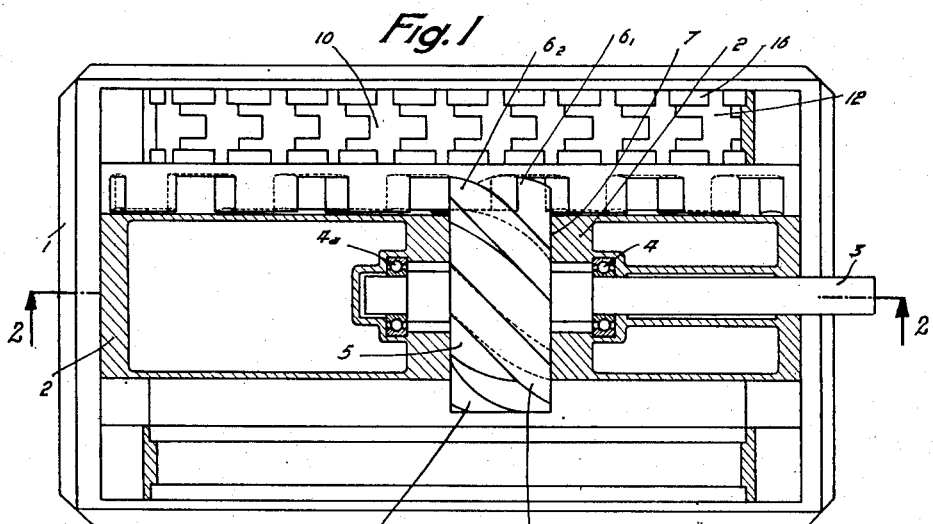
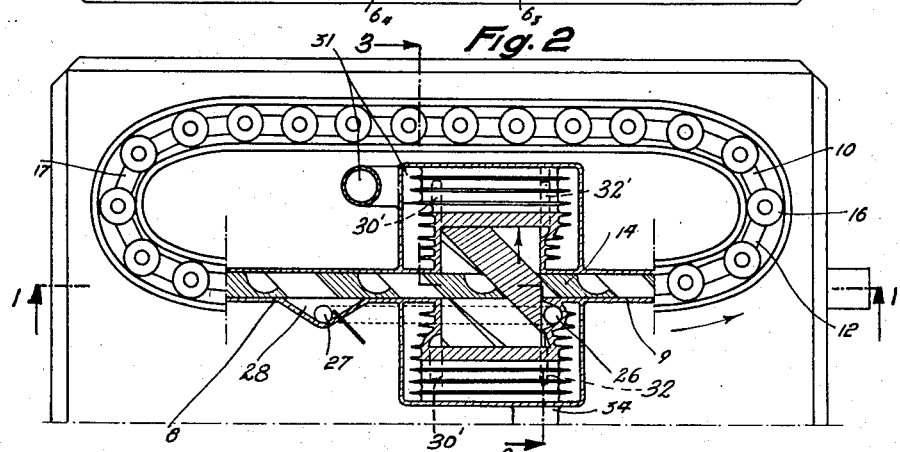
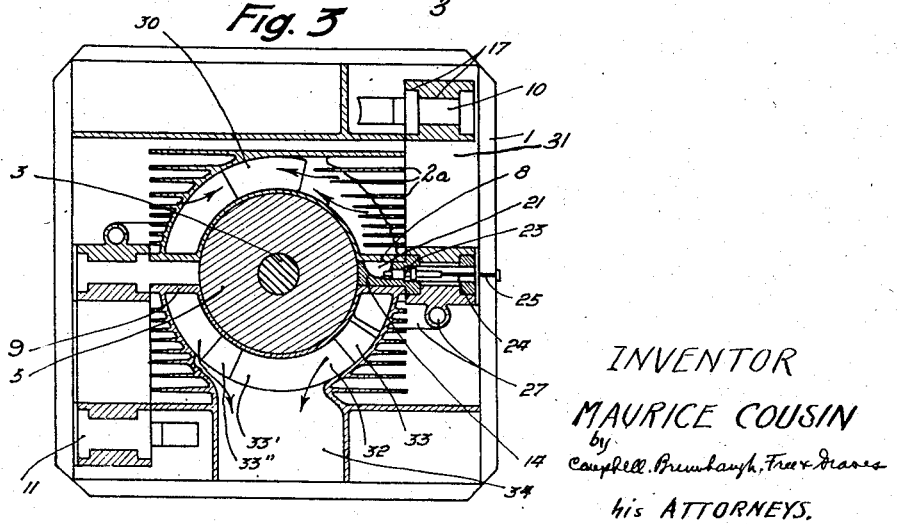
INVENTOR
MAURICE COUSIN
his ATTORNEYS.

Dec. 8, 1953 M. COUSIN 2,661,727
INTERNAL-COMBUSTION ENGINE
Filed June 21, 1951 5 Sheets-Sheet 2
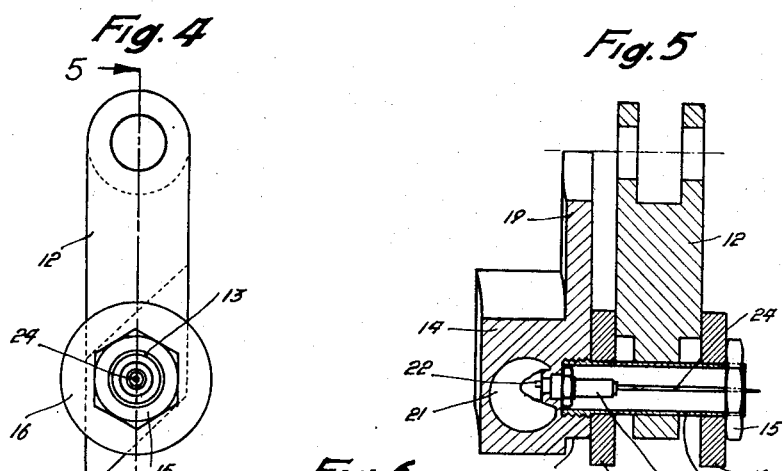
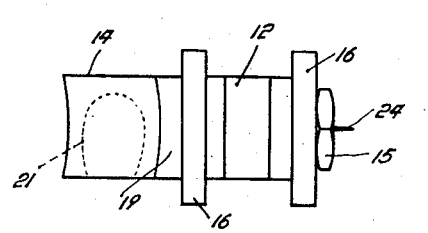
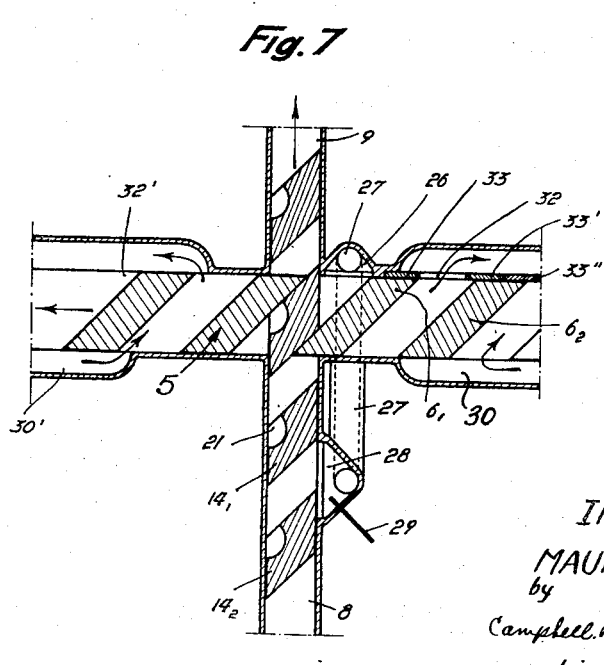
INVENTOR
MAURICE COUSIN
by
Campbell, Brumbaugh, Free & Graves
his ATTORNEYS.

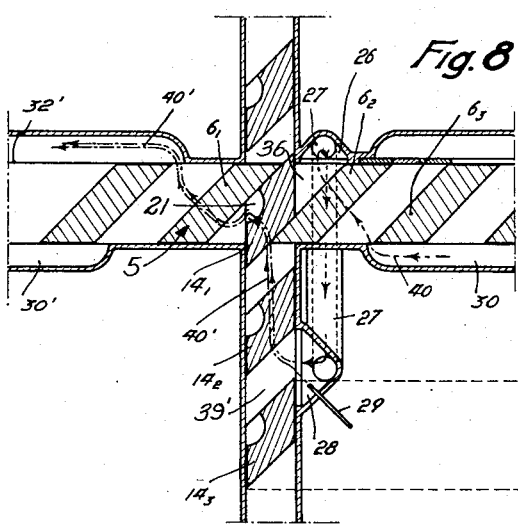
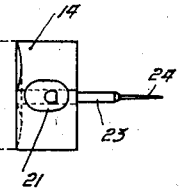
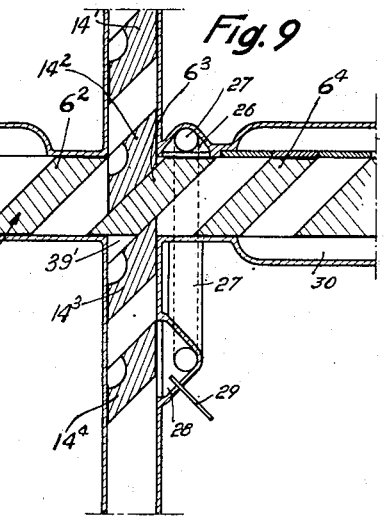
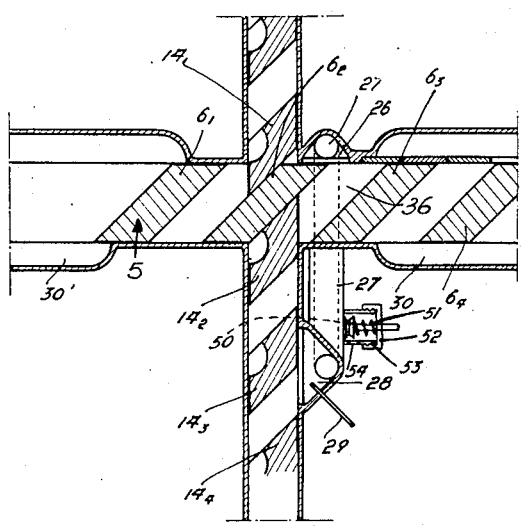

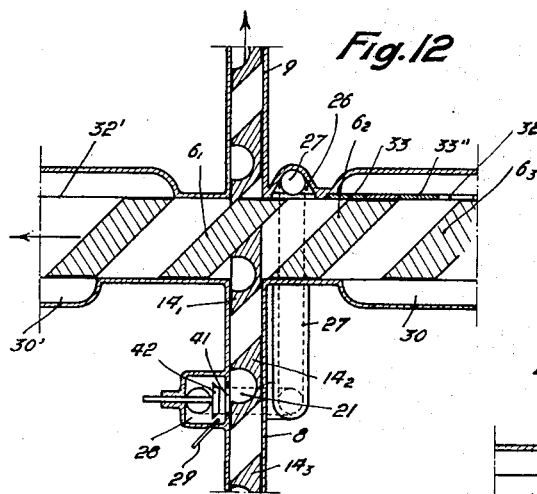
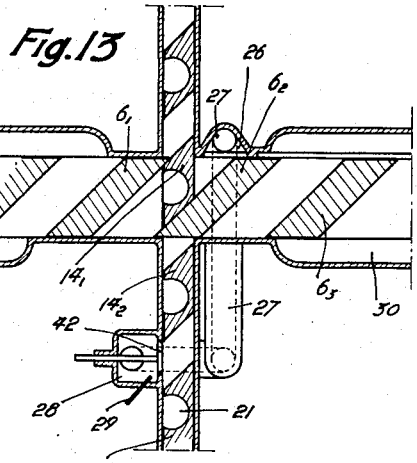
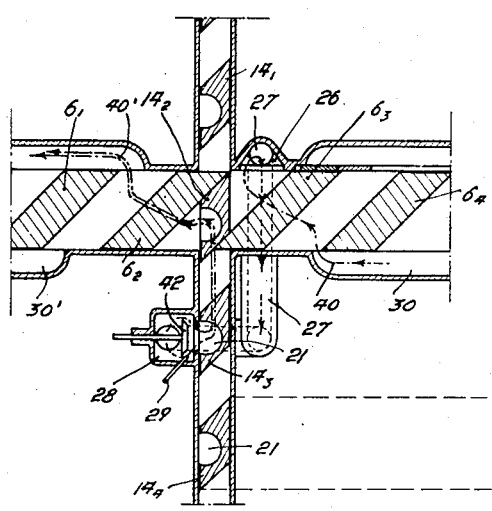
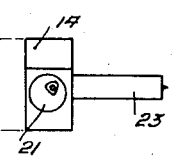

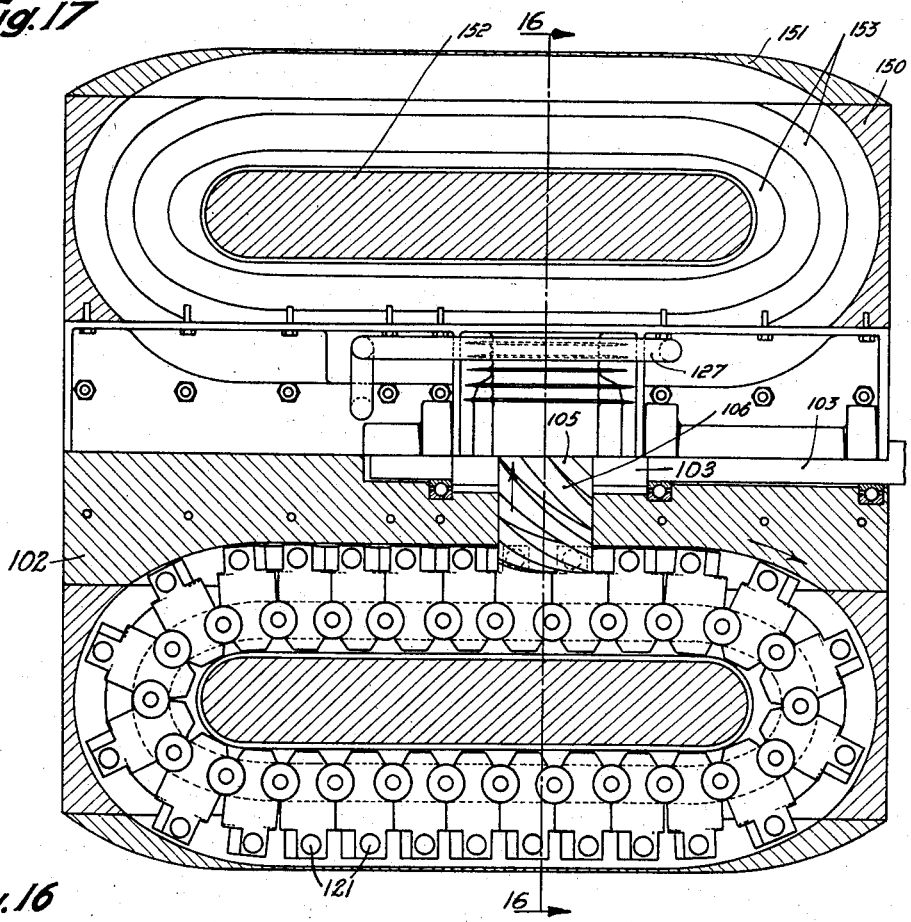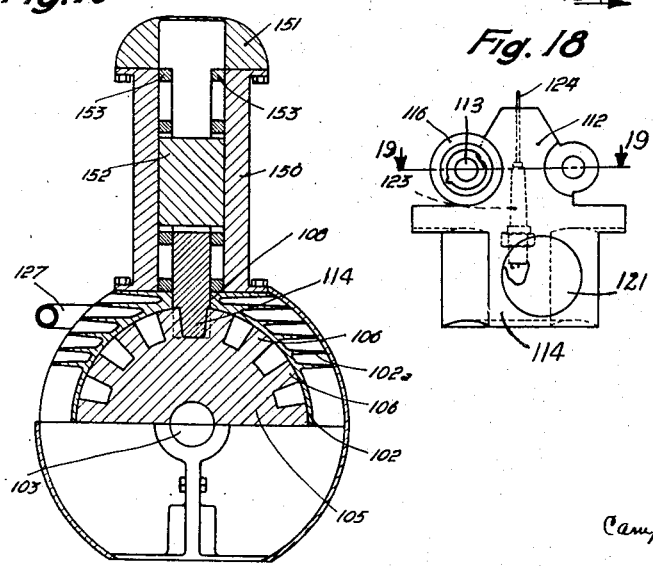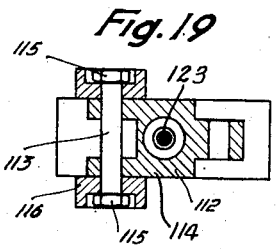

Patented Dec. 8, 1953

2,661,727

UNITED STATES PATENT OFFICE 2,661,727

INTERNAL-COMBUSTION ENGINE

Maurice Cousin, Paris, France

Application June 21, 1951, Serial No. 232,748

7 Claims. (Cl. 123—8)

This invention relates to internal combustion engines, and particularly to a non-reciprocating or continuous rotary type of such engines.

In my prior U. S. Patent No. 2,024,848 of December 17, 1935, I have disclosed an internal combustion engine of said type, in which the variable capacity of chambers produced by the meshing of a plurality of toothed members (like sprockets and gears) was utilized and in which the several operations of intake, compression, expansion and exhaust were obtained in a very simple form.

Said engine comprised an appropriately housed pair of members each having elements intermeshing with corresponding elements of the other member and arranged in progressive series such that the one series continuously crosses the path of the other, preferably perpendicularly at the point of crossing.

My present invention has for its object to provide improvements to this type of internal combustion engine.

A particular object of my invention is to provide a considerable increase of the intake of such an engine. This object is achieved by using, for said intake, not only the volume between the elements of one of the above mentioned intermeshing members, but also the variable capacities of the other member, once said member has been emptied of the burnt gases.

As in my above mentioned prior U. S. Patent No. 2,024,848, one of the intermeshing members is illustrated hereafter, by way of example, as very similar to a spiral gear, and for convenience will be referred to as the gear member, although it is to be understood I do not limit the invention to the use of a member resembling a gear as a progressive series of elements may be otherwise obtained. The other member is represented as being of a conveyor type, comprising an endless chain passing around drums and carrying the series of elements at spaced intervals so as to intermesh with the elements of the gear member. The gear-like member is contained within a cylindrical chamber, the elements of the gear member having sliding contact with the walls of this chamber so the spaces between the elements are substantially gas-tight working chambers.

Two embodiments of an engine according to the invention are exemplified in the appended drawings, in which:

Figure 1 is a longitudinal sectional view of a first embodiment through line 1—1 of Figure 2;

Figure 2 is a part sectional view through line 2—2 of Figure 1 and part elevational view, the upper side of the casing being supposed removed;

Figure 3 is a cross sectional view taken on line 3—3 of Fig. 2;

Figure 4 is a detailed side elevational view, at a larger scale, of a chain link;

Figure 5 is a sectional view of said chain link through line 5—5 of Figure 4;

Figure 6 is an end elevational view of said chain link;

Figures 7 to 10 show diagrammatically different steps in the working as effected by the crossing series of elements;

Figure 11 is a diagrammatic, front elevational view of a helical chain element used in the diagram of Figures 7 to 10;

Figures 12 to 14 are diagrams similar to those of Figures 7 to 10 in the case of a variant;

Figure 15 is a view, similar to that of Figure 11 of a helical chain element used in the diagrams of Figures 12 to 14;

Figure 16 is a part cross sectional view of another embodiment of an engine according to the invention taken on line 16—16 of Fig. 17;

Figure 17 is a part longitudinal sectional view, part elevational view of said other embodiment;

Figure 18 is a side elevational view of a chain-link used in said embodiment;

Figure 19 is a cross sectional view of said chain-link through line 19—19 of Figure 18.

In said drawings there is provided a bed-frame 1 and within said frame a casing 2 through part of which extends a rotatable shaft 3 mounted on bearings 4—4a. On said shaft is keyed a gear-like member 5 having teeth $6^1$, $6^2$, $6^3$, $6^4$ said member being tightly enclosed in a central recess 7 of casing 2. Parallel to shaft 3 and on each side of said recess 7 are provided two passages 8 and 9 for permitting entry and departure of the helical elements of two transverse, chain-like members 10 and 11, respectively, symmetrically arranged with respect to the longitudinal axis of the device. Each of said chain-link members is formed of a plurality of links 12 (Figs. 4 to 6), each link 12 being connected to the next by means of a hollow axle 13 one end of which is screwed in a corresponding helical element 14 adapted to mesh with the teeth 6 of the gear-like member 5, and the other end of which is held by a nut 15. On either side of the links 12, each axle 13 carries two rollers 16 adapted to guide the corresponding chain in a guideway 17 provided in casing 2.

Each element 14 is substantially a parallelogram in cross section including two flat, parallel sides adapted to guide said element in passages 8 and 9, obliquely arranged front and back surfaces adapted to cooperate with the flanges of teeth 6 of gear-like member 5 and a longitudinally projecting bevelled part 19 the end of which penetrates a notch 20 of corresponding shape provided in the helical element attached to the next link, so as to provide a tight closing of the open side of passages 8 and 9. In one of the flat sides of each element 14 is provided a recess 21 into which protrude the electrodes 22 of a spark plug 23, the insulated electrode of which is electrically connected to a metal rod 24 extending through the hollow axle 13 and adapted to pass in close proximity of a fixed contact plug 25 held in and insulated from frame 1, and connected to a high voltage source, not shown.

The passage 8 is provided with a lateral chamber 26 into which opens one end of a duct 27 connected to a chamber 28 on the opposite side of the recess 7 and communicating with the passage 9. A fuel injector 29, connected to a pressurized fuel supply, not shown, introduces fuel into the chamber 28.

Recess 7 in casing 2 is provided (Figs. 3 and 7-10) on the one hand, on the same side as chamber 28, with an intake port 30 (Figs. 2, 3 and 7-10), communicating with the outer atmosphere through a channel 31 into which extend fins 2a protruding from casing 2 and, on the other hand on the opposite wall, with an exhaust port 32 adapted to be partly closed by means of sliding flaps 33, 33' and 33" (Figs. 3 and 7-10) and directly communicating with the outer atmosphere by a channel 34.

A similar series of ports and openings is provided in the walls of recess 7, symmetrically with respect to the middle point of the longitudinal axis of said recess, i. e. an air intake port 30' angularly spaced from port 30, an exhaust port 32' with sliding flaps opposite port 30' communicating with another exhaust port 34', not shown. The positioning of said ports has been shown in the developed diagrams of Figs. 2, 3 and 7-10.

It is assumed that the movable members move in the direction of the arrows F (see Figs. 2, 3 and 7-10).

The working of the engine is described hereafter with more particular reference to the diagrams of Figs. 7-10:

(1st) *Suction in the gear-like member.*—The rotation of the gear-like member 5 causes the air contained in the spaces such as 36 between two teeth, say 6$^1$, 6$^2$ of said member to be centrifugally expelled (see arrows, Fig. 3) through the ports 32 and 32', while fresh air is taken in through ports 30, 30' to replace the expelled air.

(2nd) *First compression in the gear-like member.*—As the gear-like member 5 rotates, a tooth passes between two helical elements of the chain-like member, for example, the tooth 6$^2$ engages between the elements 14$^1$ and 14$^2$ of said chain-like member (Fig. 8). During this movement, the volume of space 36 decreases and the air in said space, after having been compressed, is expelled through chamber 26 and duct 27.

(3rd) *Feeding in the chain-like member.*—The air thus compressed in the gear-like member and expelled through chamber 28 and duct 27 is mixed in chamber 28 with fuel delivered by an injector 29 and is introduced into a space such as 39' (Fig. 8) between two helical elements, say 14$^2$ and 14$^3$, of the chain-like member 10, which is thus filled with combustible mixture.

(4th) *Second compression in the chain-like member.*—When a helical element such as, say, 14$^2$, has engaged between two teeth, say, 6$^2$ and 6$^3$ of the gear-like member, the volume of space 39 behind said element 14$^2$, which has previously been filled as above described with combustible mixture, begins to decrease and said decreasing continues when element 14$^3$ engages behind tooth 6$^3$ (Fig. 9) until all the mixture in said interval 39' is compressed inside the recess 21 of helical element 14$^3$, which recess also opens both on the lateral and on the front side of said element (Fig. 9).

(5th) *Ignition and expansion.*—Rod 24 of the sparking plug 23 in helical element 14$^3$ passes in front of contact plug 25 and the mixture in recess 21 is ignited. During said ignition, element 14$^3$ has advanced and reaches the position corresponding to the position of the element 14$^1$ in Fig. 8. In this position, the gases resulting from the combustion of the gases in recess 21 of element 14$^3$ escape by the lateral opening of said recess, now uncovered, and expand, in the space behind tooth 6$^2$ of the gear-like member. The expansion tends to propel the gear-like member and to drive the shaft 3, said gear-like member also driving the chain-like member.

(6th—1st) *Exhaust and new suction.*—When the space in which expansion takes place has again reached its maximum value, the expansion is ended and tooth 6$^2$ of the gear-like member uncovers the openings 32', according to the position of sliding flaps 33. The burnt gases escape centrifugally through the opening 32' and exhaust opening 34' and a new quantity of fresh scavenging air is admitted into the space through port 30', and the cycle is repeated, in cooperation with the second chain-like element (not shown in Figs. 7-10). It will be understood that the port 30' supplies air to the chain 11 in the same way that the port 30 supplies air to the chain 10. Also, the exhaust port 32' has the same relation to the chain 11 as the exhaust port 32 has to the chain 10 and suitable fuel injecting means, chambers and passages corresponding to the elements 26, 27 and 28 are provided for the chain 11.

The air, fuel and gases thus follow the track shown in Fig. 8 by the arrowed lines 40 and 40'. If it is assumed that the length of chamber 28 in the direction of rotation of the gear-like member is at least equal to the width of each tooth 6 of said member in said direction, and that the length of chamber 26 is at least equal to that of a lateral face of each element 14 of the corresponding chain like member, it may be seen that the movement of air, fuel and gases along said track shall be continuous and that the pressurized fuel supply may also be continuous.

The degree of compression in the gear-like member may be varied by means of the sliding flaps 33, 33', 33" in port 32. If flap 33 only is shifted towards the end of port 32 which is nearer to chamber 28 (Fig. 7), part of the air in space 36 will escape through port 30 and only the remaining other part shall be compressed and fed to the chain-like member. If all the flaps are shifted together towards said end (Figs. 8-10), all the air in the space 36 is compressed and fed to the chain-like member.

It is possible to arrange a variably loaded escape valve on duct 27, as shown in Fig. 10, said valve 50 being loaded by a spring 51 resting on a cover 52 which may be screwed lengthwise of the valve casing 53 to compress the spring 51 more or less, as required, said casing being provided with an outlet opening 54.

The fresh air passing on fins 2a and in the intervals between two consecutive teeth of the gear like member, during and after the suction operation, contributes to the cooling of casing 2.

According to another embodiment of my invention, illustrated in Figs. 12–15, the recesses 21 in the helical members 14 open only on the lateral side of said members. In this case, chamber 28 opens in passage 8 by means of a port 41 adapted to be closed by a valve 42 controlled by any known device, such as a cam, not shown, synchronized with shaft 3 and arranged so that port 41 is opened only when a recess 21 is opposite said port. Instead of providing such a valve, the feeding of fuel through injector 29 may be adapted to be periodically established and interrupted, in order that fuel should be injected only when a recess 21 is opposite port 41. Such a result may be obtained by means of a discontinuous injection pump known per se.

With the arrangement shown, the second compression in the chain-like member does not occur and the working of the engine may be briefly described as follows:

(1st) *Suction.*—Fresh air is admitted in a space between two teeth, say, 6² and 6³, of the gear-like member (Fig. 12).

(2nd) *Compression in the gear-like member.*—Said space decreases and the air is compressed, and expelled through chamber 28 in duct 27 and, chamber 26. Valve 42 is closed (Fig. 13).

(3rd) *Feeding in the chain-like member.*—A recess 21 in an element, say, 14³, comes opposite port 41. Valve 42 opens and the compressed air is fed into said recess 21, together with fuel injected through injector 29 (Fig. 14).

(4th) *Ignition and expansion.*—The combustible mixture in said recess 21 is carried by the corresponding element, until said recess nearly reaches the track of the gear-like member (position of element 14² intermediate between Figs. 13 and 14). The combustible mixture in said recess is ignited as previously explained and the resulting gases expand behind the corresponding tooth of the gear like member, for instance behind tooth 6¹ (Figs. 12 and 13) if the recess 21 in element 14¹ is considered.

(5th) *Exhaust.*—When the front part of the space between two teeth, say 6¹ and 6², of the gear-like member, reaches openings 35″ and 35‴, the burnt gases escape centrifugally and a new quantity of air is admitted through port 30′, and the cycle continues.

The path of the air, fuel and gases is shown in Fig. 14 by the arrows 40—40′.

In the above described engine, the chain like members are guided in planes which are tangential to the gear-wheel 5. According to another embodiment, shown at Figs. 16–19, said members may be guided in a plane passing through the longitudinal axis of said wheel.

In said figures, the shaft of the engine is shown at 103, and the gear-wheel 105 is enclosed in casing 102 provided with fins 102a. The duct 127 leading from the gear-like member to one of the chain-like members may also be recognized. The two chain like members are enclosed each in a casing 150 extending radially from casing 102 and bolted on said casing 102. Each casing 150 is closed by a cover 151 and is provided with a central part 152. The chain-like members are formed of links 112 connected together by means of axles 113 on which rollers 116 are held by means of nuts 115. Said rollers 116 are guided in a track formed of two pairs of rails 153, fast with casing 150. Each link carries a protruding helical element 114 having two flat, parallel sides adapted to be guided in the passages such as 108 provided for admitting entry and departure of the chain elements in and from meshing engagement with the teeth 106 of gear-wheel 105, and obliquely arranged front and back surfaces adapted to cooperate with the flanges of said teeth. In one side of each element 114 is provided a recess 121 into which protrude the electrodes of a sparking plug 123 one of said electrodes being connected to the rod 124.

It may be seen that a perfect guiding, with the minimum play, is thus obtained for the chain-like members.

What I claim is:

1. An internal combustion engine comprising a rotary cylindrical member, said member having on its periphery a plurality of helical grooves opening at both ends, a tight casing for the cylindrical member, said casing having at least two, diametrically opposed, lateral openings in communication with the outer atmosphere and adapted for successively and directly communicating with the helical grooves in the cylindrical member, a plurality of movable hollow helical members adapted for successively traversing said grooves and forming with these grooves and the walls of the casing working chambers of variable capacity, said casing providing a tight passage for the hollow helical members on each side of the rotary cylindrical member, a connecting duct opening at one end in the wall of said casing against a terminal surface of said rotary cylindrical member, and at its other end in the tight passage for the hollow helical members, a recess provided in the wall of each said hollow helical member on the side of said member and adapted to communicate with said connecting duct, means for injecting fuel in said connecting duct and means within said hollow helical member for igniting a gas mixture in the working chamber.

2. An internal combustion engine comprising a rotary cylindrical member, said member having on its periphery a plurality of helical grooves opening at both ends, a tight casing for the cylindrical member, said casing having at least two, diametrically opposed, lateral openings in communication with the outer atmosphere and adapted for successively and directly communicating with the helical grooves in the cylindrical member, means for varying the surface of one of said openings, a plurality of movable hollow helical members adapted for successively traversing said grooves and forming with these grooves and the walls of the casing working chambers of variable capacity, said casing providing a tight passage for the hollow helical members on each side of the rotary cylindrical member, a connecting duct opening at one end in the wall of said casing against a terminal surface of said rotary cylindrical member, and at its other end in the tight passage for the hollow helical members, a recess provided in the wall of each hollow helical member on the side of said member and adapted to communicate with said connecting duct, means for injecting fuel in said connecting duct and means within said hollow helical members for igniting a gas mixture in the working chamber.

3. An internal combustion engine comprising a rotary cylindrical member, said member having on its periphery a plurality of helical grooves openings at both ends, a tight casing for the cylindrical member, said casing having at least two, diametrically opposed, lateral openings in communication with the outer atmosphere and adapted for successively and directly communicating with the helical grooves in the cylindrical member, a plurality of movable hollow helical members adapted for successively traversing said grooves and forming with these grooves and the walls of the casing working chambers of variable capacity, said casing providing a tight passage for the hollow helical members on each side of the rotary cylindrical member, a connecting duct opening at one end in the wall of said casing against a terminal surface of said rotary cylindrical member, and at its other end in the tight passage for the hollow helical members, a recess provided in the wall of each said hollow helical member said recess opening both laterally and in the front of said helical member in the direction of its movement, means for injecting fuel in said connecting duct and means within said hollow helical members for igniting a gas mixture in the working chamber.

4. An internal combustion engine comprising a rotary cylindrical member, said member having on its periphery a plurality of helical grooves opening at both ends, a tight casing for the cylindrical member, said casing having at least two, diametrically opposed, lateral openings in communication with the outer atmosphere and adapted for successively and directly communicating with the helical grooves in the cylindrical member, a plurality of movable hollow helical members adapted for successively traversing said grooves and forming with these grooves and the walls of the casing working chambers of variable capacity, said casing providing a tight passage for the hollow helical members on each side of the rotary cylindrical member, a connecting duct opening at one end in the wall of said casing against a terminal surface of said rotary cylindrical member, and at its other end in the tight passage for the hollow helical members, means for closing said duct in relation with the rotation of said rotary cylindrical member a recess provided in the wall of each said hollow helical member on the side of said member and adapted to communicate with said connecting duct, means for injecting fuel in said connecting duct and means within said hollow helical members for igniting a gas mixture in the working chamber.

5. An internal combustion engine comprising a rotary cylindrical member, said member having on its periphery a plurality of helical grooves openings at both ends, a tight casing for the cylindrical member, said casing having at least two, diametrically opposed, lateral openings in communication with the outer atmosphere and adapted for successively and directly communicating with the helical grooves in the cylindrical member, a plurality of movable hollow helical members adapted for successively traversing said grooves and forming with these grooves and the walls of the casing working chambers of variable capacity, said casing providing a tight passage for the hollow helical members on each side of the rotary cylindrical member, a connecting duct opening at one end in the wall of said casing against a terminal surface of said rotary cylindrical member, and at its other end in the tight passage for the hollow helical members, a recess provided in the wall of each said helical member on the side of said member and adapted to communicate with said connecting duct, means for periodically injecting fuel in said connecting duct and means within said hollow helical members for igniting a gas mixture in the working chamber.

6. An internal combustion engine comprising a rotary cylindrical member, said member having on its periphery a plurality of helical grooves openings at both ends, a tight casing for the cylindrical member, said casing having at least two, diametrically opposed, lateral openings in communication with the outer atmosphere and adapted for successively and directly communicating with the helical grooves in the cylindrical member, a plurality of movable hollow helical members adapted for successively traversing said grooves and forming with these grooves and the walls of the casing working chambers of variable capacity, said casing providing a tight passage for the hollow helical members on each side of the rotary cylindrical member, a connecting duct opening at one end in the wall of said casing against a terminal surface of said rotary cylindrical member, and at its other end in the tight passage for the hollow helical members, a recess provided in the wall of each said hollow helical member on the side of said member and adapted to communicate with said connecting duct, means for injecting fuel in said connecting duct and means within said hollow helical members for igniting a gas mixture in the working chamber, cooling fins on the outside of said tight casing for the rotary cylindrical member, and means for leading air along said fins to one of said lateral openings in said casing.

7. An internal combustion engine comprising a tight casing, one helically threaded screw within said tight casing, at least one succession of interconnected helical projecting members meshing with said screw and following a continuous track of suitable shape by moving along one generatrix of said screw, said members, screw threads and casing cooperating to form working chambers of variable capacity, said casing providing a tight passage for the hollow helical members on each side of the rotary cylindrical member, a connecting duct opening at one end in the wall of said casing against a terminal surface of said rotary cylindrical member, and at its other end in the tight passage for the hollow helical members, a recess provided in the wall of each said hollow helical member on the side of said member and adapted to communicate with said connecting duct, means for injecting fuel in said connecting duct and means within said hollow helical members for igniting a gas mixture in the working chamber.

MAURICE COUSIN.

References Cited in the file of this patent

UNITED STATES PATENTS

| Number | Name | Date |
|---|---|---|
| 2,024,848 | Cousin | Dec. 17, 1935 |